United States Patent
Sharma

(10) Patent No.: US 8,917,862 B2
(45) Date of Patent: Dec. 23, 2014

(54) AUTOMATED RESPONSE SYSTEM TUNING

(75) Inventor: Rajesh Sharma, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1498 days.

(21) Appl. No.: 12/164,616

(22) Filed: Jun. 30, 2008

(65) Prior Publication Data
US 2009/0323910 A1    Dec. 31, 2009

(51) Int. Cl.
  H04M 3/00    (2006.01)
  H04M 3/493   (2006.01)
  H04M 3/51    (2006.01)
  H04M 3/42    (2006.01)

(52) U.S. Cl.
  CPC ........ H04M 3/5166 (2013.01); H04M 3/42068 (2013.01); H04M 3/4938 (2013.01); Y10S 379/917 (2013.01)
  USPC ............... 379/266.07; 379/88.04; 379/917

(58) Field of Classification Search
  USPC ............. 379/88.18, 265.01–266.1, 209.01, 379/211.02, 265.07, 88.04, 917
  See application file for complete search history.

(56) References Cited

U.S. PATENT DOCUMENTS

| | | | | |
|---|---|---|---|---|
| 6,038,307 A | * | 3/2000 | Fahrer et al. | 379/209.01 |
| 7,400,718 B2 | * | 7/2008 | Alhadad et al. | 379/265.07 |
| 8,036,362 B1 | * | 10/2011 | Skinner | 379/211.02 |
| 2006/0126818 A1 | * | 6/2006 | Berger et al. | 379/265.09 |

* cited by examiner

*Primary Examiner* — Md S Elahee

(57) ABSTRACT

A system and method for creating, storing, and retrieving data associated with initiated communications to a vendor are disclosed. An exemplary system includes a response server in communication with a database that provides a platform for storage and retrieval of records created by the response server. The response server is configured to provide a series of menus including a group of selections during the initiated communications to the vendor and receive inputs in response to the menus. The response server is further configured to create a record for each initiated communication as the initiated communication is occurring, and to create a report including at least a portion of the data from each record. The portions of data taken from each record each describe a characteristic of at least one of the inputs for the initiated communication associated with each respective record.

20 Claims, 8 Drawing Sheets

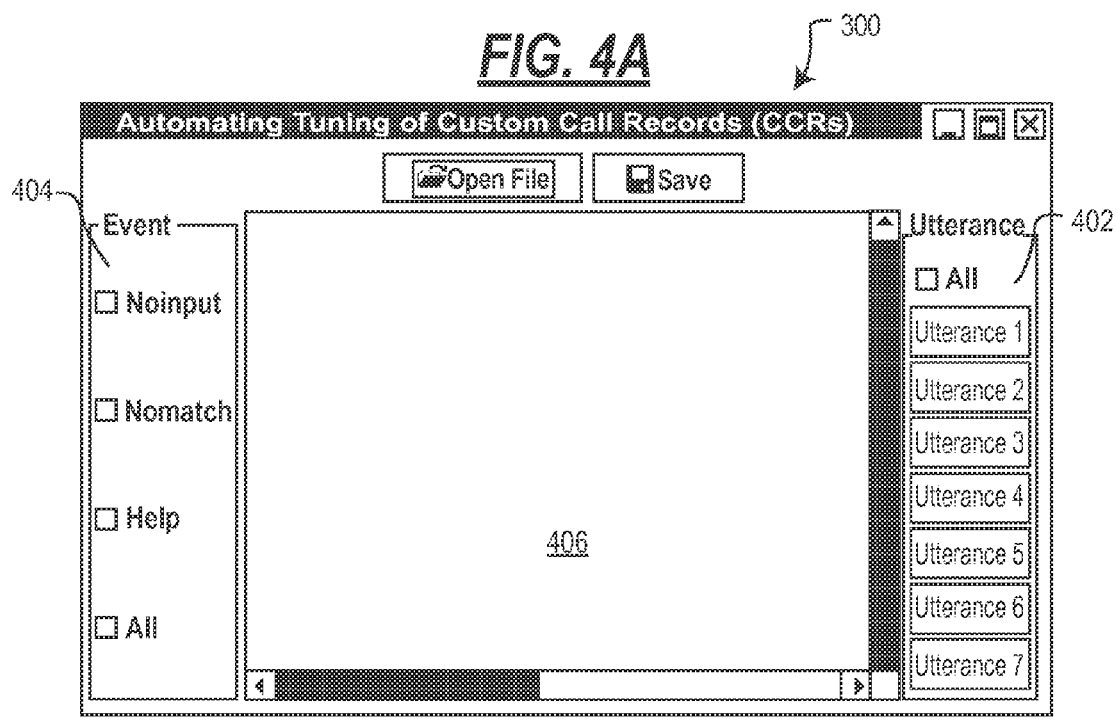
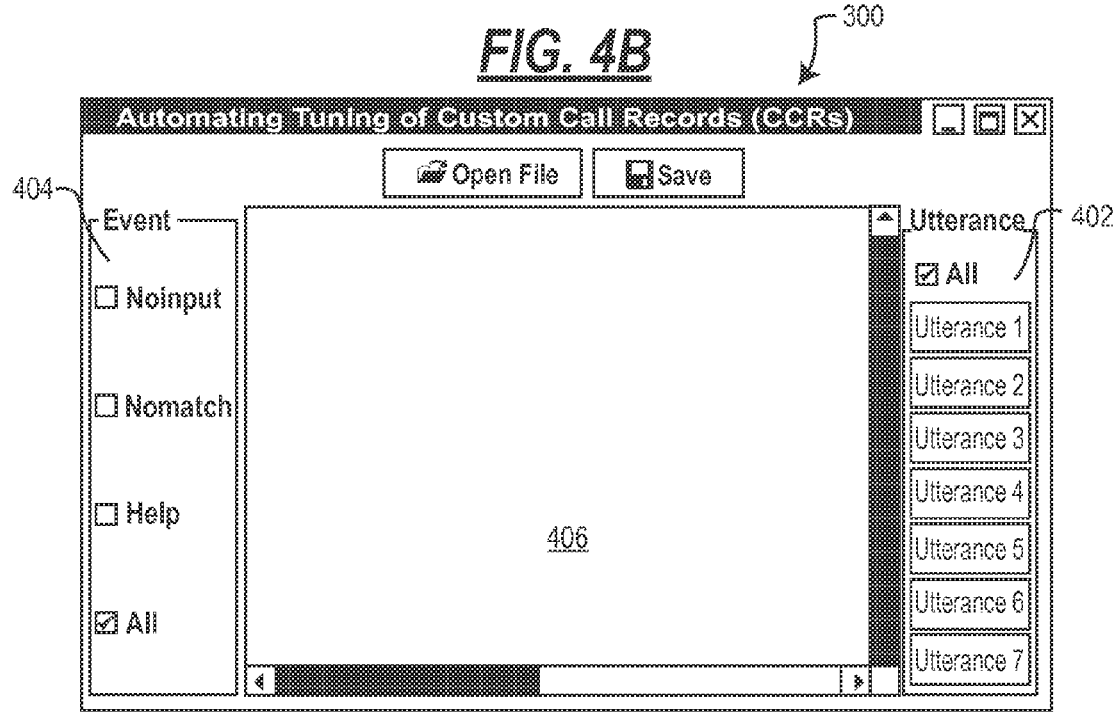

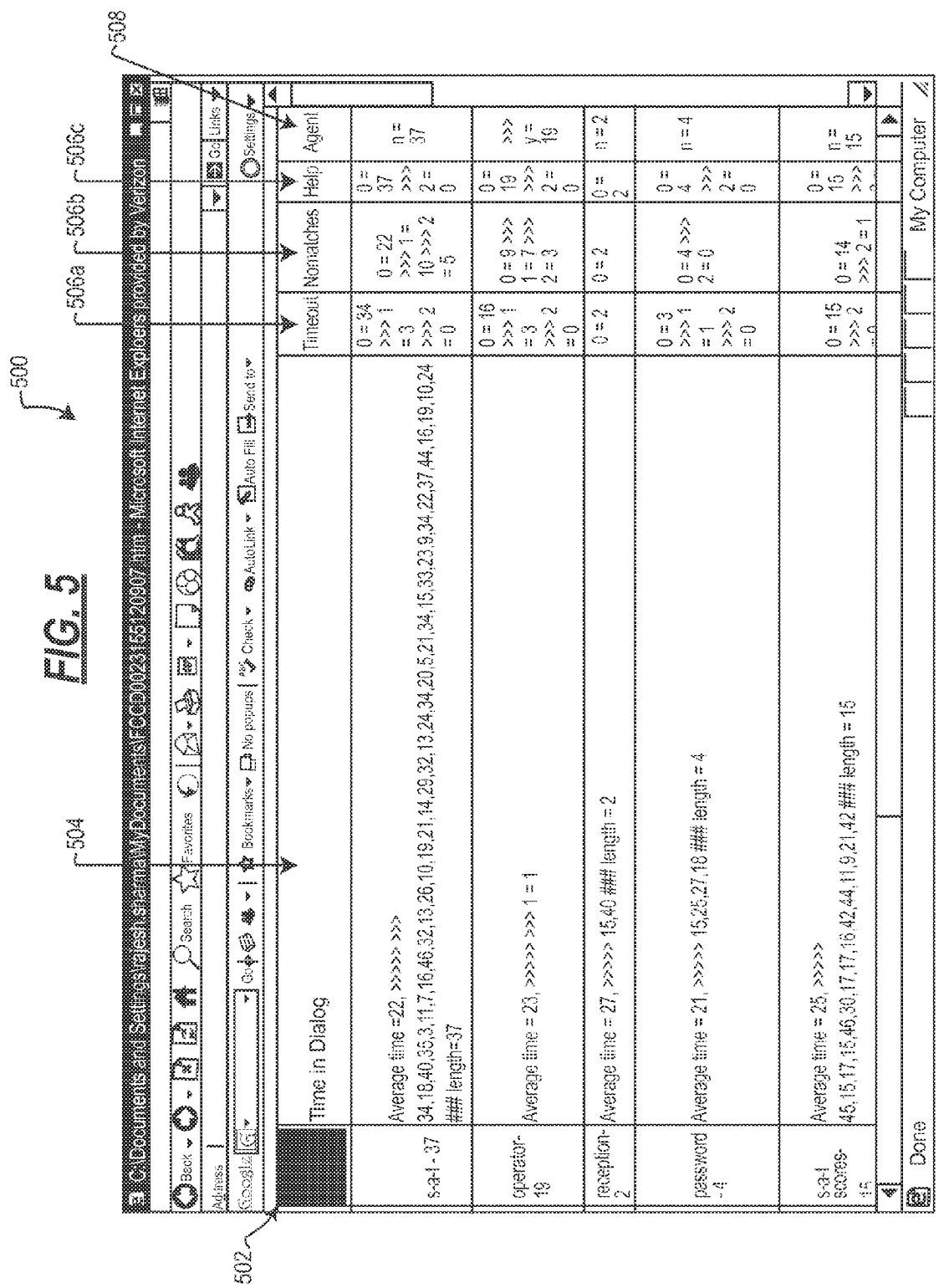

AUTOMATED RESPONSE SYSTEM TUNING

BACKGROUND

Automated initiated communication response systems have become useful for helping organizations and individuals manage incoming initiated communications, e.g., phone calls, electronic communications such as packet-switched data, etc. Most commonly, these response systems enable organizations to handle large volumes of initiated communications by directing incoming initiated communications to a particular branch or individual of the organization or by allowing the initiated communication to extract information from the organization via the automated system, generally without the assistance of live support personnel.

In one known example, incoming phone calls are directed to an automated menu. Callers can select a particular division or individual, or obtain information directly, by calling a hotline phone number and selecting options from a menu played over the phone to the caller. In another example, customers may log in to a website associated with an organization, allowing the customers to enter and retrieve information from databases associated with the organization, i.e., packet-switched data transmitted over an internet connection. In each case, the response systems generally allow the customer to enter and retrieve data without requiring assistance from live support personnel at the organization. These response systems may thereby enhance customer service by allowing efficient servicing of large numbers of incoming requests for information without increasing demands on human resources of an organization.

Because live support personnel are not actively engaged with incoming initiated communications, problems may not be evident in a response system until a customer complains directly to support personnel. For example, if a particular selection in an automated telephone menu, e.g., a request for customer support, is resulting in a long wait time for the customer to be connected with live support personnel, or a particular selection is not operational, customers may become frustrated and simply hang up. Thus, by the time live support personnel are made aware of many problems with a response system, multiple customers have already likely been frustrated with the response system.

Accordingly, there is a need to detect and diagnose problems with response systems more quickly, preferably before a large number of customers experience the problem directly.

BRIEF DESCRIPTION OF THE DRAWINGS

FIG. 4A illustrates an exemplary graphical user interface for interacting with a response server;

FIG. 4B illustrates the graphical user interface shown in FIG. 4A after a selection;

FIG. 5 illustrates an exemplary record report document; and

DETAILED DESCRIPTION

Figure 1:
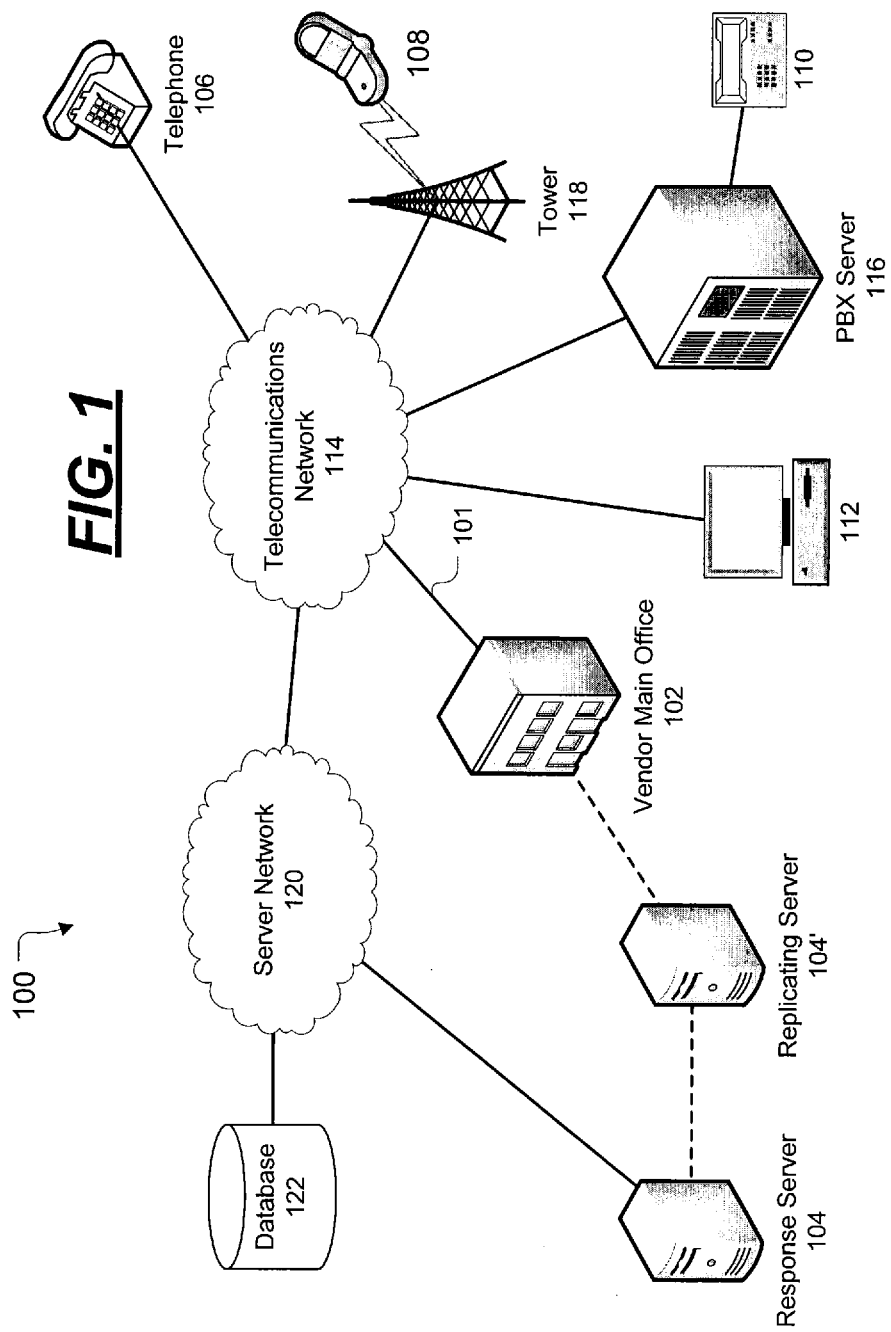
FIG. 1 illustrates an exemplary architecture of a communication system including a response server.

Various examples of systems and methods for compiling data associated with initiated communications to a vendor to determine operating characteristics of a response system are disclosed. Initiated communications may include phone calls, electronic communications (e.g., packet-switched submissions over a data network), or any other automated communication not involving assistance from a live personnel of the vendor. Generally, a record associated with an initiated communication may be created while the initiated communication occurs. The record may include a plurality of fields, each of which is relevant to a particular step or result that occurs during the initiated communication. The record can be stored to allow retrieval so that the data may be displayed or presented to determine an operating characteristic associated with a plurality of initiated communications. Examples of a step of an initiated communication may include a particular menu that is provided to a customer during an automated phone call, a list of options presented over a website, or any other phase of an initiated communication. Examples of a result occurring during an initiated communication include a particular selection available on a menu or during a communication, a result of a selection or lack thereof by a customer, or any other response of an automated system, e.g., an automated telephone system, that occurs during an initiated communication. Fields of the records are generally populated with data regarding a step and/or result while a customer is participating in the initiated communication, i.e., as the customer is selecting various steps from a menu. These records may then be parsed with a graphical user interface to display one or more characteristics of a volume of initiated communications that is determined from the extracted data. For example, data may be retrieved from a particular one of the fields of each record that is stored, and a characteristic of the response system with respect to a step associated with the particular field may be determined at least in part according to the retrieved data. Additionally, data may be parsed from the records according to the result itself, e.g., all fields may be displayed that contain data indicating whether the step reached a successful result or conclusion. For example, a lack of a selection by a customer, or repeated requests for live assistance entered by the customer during a given phase of an initiated communication may indicate that the particular phase is not functioning correctly.

An exemplary system may generally include a response server in communication with a data network. The data network may include a data line for a vendor configured to transmit initiated communications to the vendor, e.g., phone calls, packet-switched data, etc. The response server is in communication with a database that provides a platform for storage and retrieval of records created by the response server. The response server is configured to provide a series of menus including a group of selections during the initiated communications to the vendor and receive inputs in response to the menus. The response server is further configured to create a record for each initiated communication as the initiated communication is occurring. The records include a plurality of fields, each of which are associated with one of the menus provided by the response server, and data in at least one of the fields. The data describes at least one characteristic of the input to the menu associated with the field in which the data is contained. The response server is further configured to create a report including at least a portion of the data from each record. The portions of data taken from each record each describe a characteristic of at least one of the inputs for the initiated communication associated with each respective record.

An exemplary method may include providing a series of menus during a plurality of initiated communications, each menu including a group of selections, and receiving an input in response to at least one of the menus. The illustrative method also includes creating a record for each initiated communication during the initiated communication. The records may include a plurality of fields, each of which are associated with one of the menus provided by the response server, and data in at least one of the fields. The data describes at least one characteristic of the input to the menu associated with the field in which the data is contained. The example further includes creating a report including at least a portion of the data from each record, the data portions describing a characteristic of at least one of the inputs for the initiated communication associated with each respective record.

FIG. 1 illustrates a general architecture and operation of a telecommunications system 100, according to an exemplary approach. System 100 generally allows for the receipt of initiated communications via one or more data networks, including a data line 101, to a vendor 102. For example, a response server 104 may be in communication with a vendor 102 via one or more data networks shown in general terms by a telecommunications network 114. Response server 104 may create, store, and retrieve records associated with initiated communications directed to the vendor 102. A user, e.g., a potential customer, may initiate contact such as by way of a phone call or data connection to the vendor 102 with any of a variety of telecommunications devices, e.g., telephones 106, 108, 110 or computer 112 as further described below. The response server 104 generally stores customer records that are created as customers progress through steps of the communication they initiate with vendor 102. For example, as customers select certain options from a menu, e.g., an automated telephonic menu, a menu of options presented on a web page, etc., a record of the selected options including data associated with each step is created by response server 104. Response server 104 may be in communication with a replicating server 104' that periodically retrieves all records stored in response server 104. While response server 104 and database 122 are generally described herein as creating, storing, and providing records according to requests of a user associated with vendor 102, replicating server 104' may also provide for creation and/or storing of records, or generating reports as further described below. Records of the initiated communications may thus be created and stored without intervention by support personnel of the vendor 102, or even knowledge of a customer.

Any variety of communications or telephone devices may be employed by a customer or user to initiate a communication to or a data connection with a vendor 102. For example, conventional telephone 106, wireless device 108, and private business exchange (PBX) phone 110 may each place and receive calls over telecommunications network 114 in system 100, and particularly may place calls to vendor 102. Vendor 102 may be a toll-free phone line, hotline or other telephone or data line, whether wired or wireless, allowing a generally single point of contact for customers using devices 106, 108, 110. Additionally, customers or users may initiate communications to vendor 102 using computer 112, as described further below. A customer may thus submit data over an initiated communication to vendor 102 in a variety of forms, such as by entering selections on a menu provided by response server 104 over telecommunications network 114. Although not specifically illustrated in FIG. 1, vendor 102 may have telephones or other communications devices associated therewith for receiving and initiating communications such as telephone calls across network 114 from/to devices 106, 108, 110, 112.

Conventional telephone 106 may be any land-line telephone, of which a variety of examples are known. Conventional telephone 106 may generally communicate through any Public Switched Telephone Network (PSTN). Wireless device 108 may be a wireless telephone, although other kinds of telecommunications devices may be included in various approaches. For example, wireless device 108 could include a variety of devices used to place and receive calls and transmit or receive other data communications such as personal computers, laptop computers, handheld computers, personal digital assistants, wireless e-mail devices, or devices that include some combination of a computer and a telephone. PBX phone 110 may function as a part of a PBX network including a PBX server 116, which is also generally known. Each of devices 106, 108, 110 may generally communicate through telecommunications network 114 using SS7 signaling, as an example. Further, other telecommunications devices which are well known may be implemented in system 100. For example, a Voice over Internet Protocol (VoIP) device may be implemented in system 100, and may communicate with various telecommunications devices over system 100 as is generally known.

In examples where a vendor 102 provides a website available over telecommunications network 114 through which computer 112 may retrieve customer-related data, customers or users may initiate communications to vendor 102 using computer 112. Examples include an automated help desk or informational website for the benefit of the customer, where the customer may retrieve personal data relating to an account held with vendor 102. Telecommunications network 114 thus may include a packet-switched network, i.e., the internet, for receipt and transmission of data in the form of packets associated with submissions and requests from computer 112.

Although a single one of the telecommunications devices 106, 108, 110, 112 are shown, there may be a large number of telecommunications devices 106, 108, 110, 112 in communication with or through system 100 at any given time. Similarly, FIG. 1 depicts a single tower 118 to allow wireless device 108 to communicate with system 100, although it is to be understood that system 100 likely will include hundreds if not thousands of towers 118. Further, FIG. 1 illustrates one PBX server 116 which allows PBX phone 110 to communicate with system 100, although in practice system 100 will likely include a great number of PBX servers 116 and associated PBX phones 110. Moreover, FIG. 1 should not be interpreted to suggest that there is necessarily any geographic limitation to system 100. In fact, system 100 may facilitate communications between different cites, states, and even countries.

Communications through system 100 may be initiated, for example, when a call is placed by a user of conventional telephone 106, as is generally well known. Conventional telephone 106 may be in communication with telecommunications network 114 through a PSTN linked using SS7 signaling. As an example, conventional telephone 106 may initiate a call which may be transferred through telecommunications network 114. SS7 signaling provided by telecommunications network 114 may provide supervising, alerting, and addressing functions. Telecommunications network 114 may be a packet-switched network, such as an internet protocol (IP) network in combination with a circuit-switched network such as the public switch telephone network (PSTN). Accordingly, it is to be understood that network 114 includes switches, links, gateways, etc., as necessary to facilitate the transmission of calls and data between device 106 and vendor 102.

Wireless device 108 generally communicates with local tower 118 within range of device 108. Tower 118 may transmit communication signals from device 108 to a Mobile Telephone Switching Office (MTSO, not shown). Each MTSO is associated with one or more towers 118 and each generally simultaneously or nearly simultaneously handles communications for a plurality of wireless devices 108, including at least monitoring all communications, e.g., calls, tracking the location of each device 108, e.g., phone, and arranging handoffs between the various towers as may be necessary. Wireless device 108 may be generally linked to other telecommunications devices including PBX server 116, telephone 106, another wireless device 108, etc., by a telecommunications network 114, as is well known.

Communication signals from wireless device 108 are transmitted via network 114 when a user of a device 108 places a call to vendor 102. Network 114 generally routes calls from device 108 through a circuit-switched or packet-switched network to a receiver device such as a phone associated with vendor 102. Further, wireless device 108 may communicate with conventional telephone 106, PBX phone 110 or another wireless device (not shown).

Communications through system 100 may also be initiated when a call is placed by PBX phone 110. As an example, PBX phone 110 may initiate a call which may be switched through PBX server 116, as is generally known. PBX server 116 subsequently communicates over telecommunications network 114 with vendor 102. Further, PBX phone 110 may communicate with any other telecommunications device such as wireless device 108, conventional telephone 106, or another PBX phone (not shown).

As further described below in regard to process 600, server network 120 generally detects incoming communications such as calls or data submissions to vendor 102 from each of devices 106, 108, 110, 112. Server network 120 may subsequently notify response server 104 of the initiated communication. Response server 104 may then create a record associated with the initiated communication. Database 122 may be provided on other nodes of server network 120, and may provide a platform to store records created by response server 104 and facilitate their retrieval by response server 104. Database 122 may generally includes one or more relational database systems that allow for storage and retrieval of records associated with the initiated communications directed to vendor 102, as will be described further below.

Response server 104 and database 122 may include any one of a number of computing devices, including, without limitation, a computer workstation, a desktop, notebook, laptop, or handheld computer, or some other known computing device. Computing devices such as the foregoing may employ any of a number of known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system.

Computing devices in various examples such as response server 104 and/or database 122 may each include instructions executable by one or more computing devices such as those listed above. Such instructions may be compiled or interpreted from computer programs created using a variety of programming languages and/or known technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Response server 104 includes logic or a heuristic for creating records according to initiated communications, and also generating a report document(s) from the records. For example, response server 104 may generate a custom call record (CCR) for an incoming phone call, and store the record in database 122. In examples where an initiated communication is in the form of a packet-switched data, e.g., submissions via menus provided on a website, response server 104 may create a record of the website submissions from a customer during a given session. Records generally may be stored for retrieval wherever it is convenient, e.g., within database 122, response server 104, and/or replicating server 104'. Records may be stored in any form that is convenient, such as a comma delimited file (.cvs file), word processing document, spreadsheet, or any other organized presentation of data.

In examples where initiated communications received by vendor 102 are phone calls, i.e., vendor 102 provides an automated system for customers to enter and/or retrieve data from vendor 102 via devices 106, 108, 110 records may take the form of custom call records. For example, a response server 104 may be an Interactive Voice Response (IVR) platform, such as a Next Generation Service Node (NGSN) platform, that provides menu selections to a customer via devices 106, 108, 110. Customers may progress through the menu selections by entry on a numeric keypad of devices 106, 108, 110, or by stating a particular phrase or utterance defined by the system 100 for the customer, e.g., "help," "test scores," "SAT," etc. Response server 104 thus stores customer specific data, e.g., in the form of CCRs, that are collected by a call processing application of response server 104. In other words, response server 104 detects incoming calls or other initiated communications to the vendor 102, and generates records, such as CCRs, as the call progresses through automated steps. CCRs thus includes a plurality of fields that are each relevant to particular steps of the associated phone call or particular results occurring during the associated phone call, e.g., selections entered by a customer for a particular menu, words or phrases uttered by the customer that are recognized or not recognized by the response server 104, or data associated with particular events during a call such as wait times after entry of a selection.

Records generally may include identifying information for organization and retrieval of the records in/from database 122. For example, CCRs may include a header having identifying data for the initiated communication associated with the record, such as an identifying number for a particular data line associated with vendor 102 that handled the initiated communication, type of initiated communication, date, time, and duration of the initiated communication. For example, the sample header below indicates that a CCR record was created for data line number 0023155 for a phone call that began on Dec. 7, 2007 and lasted until 3:58 am on Dec. 8, 2007.

(1) *HCCRS FOR:0023155 #RECS=00000802 FOR: 2007/12/07-2007/12/08 ON:12/08/2007 03:58:15

Records may further include a plurality of data fields, e.g., a set of standard call summary information fields, dynamic or custom data fields, and standard dial-out information fields. Standard call summary information fields include information describing the initiated communication itself, e.g., phone number or other identifying number that initiated the communication, a start time, end time, and duration of the initiated communication. Dynamic or custom data fields may be present only in records where the field was used during the associated initiated communication. For example, custom fields may be included only where data relevant to the field, e.g., a particular option selected by a user for a menu presented during the initiated communication or data indicating how long a customer waited after selecting a "help" option from a test score presentation menu, is generated during the initiated communication. Dial-out fields include information describing characteristics of the call determined at the conclusion of a call, or at any other transitional point such as the transfer of a call to another department. Accordingly, dial-out information may be created at the conclusion of an initiated communication. For example, information may be listed describing how the call was terminated or transferred, such as the caller selecting a "log off" option, hanging up, requesting another department, what department was selected by the caller, etc. In the example listed in Table 1 below, the dial-out fields are listed in fields 105 to 133. CCRs may employ a comma field delimiter format and an end-of-record delimiter. An end-of-record delimiter for a CCR may be a carriage return followed by a line feed (i.e., <CR> <LF>).

A sample CCR format is shown in Table 1 below, which lists available fields and a description of content for each field.

TABLE 1

Example of CCR and Available Fields

| Field Number | Description/Content |
|---|---|
| 1 | Header |
| 2 | Call Start Time - Time the application answered the call in "yymmddhhmmss" format. |
| 3 | Platform Call Duration - Length of the call in seconds. Includes time in the Enterprise Customer Service (ECR) system plus time bridged if full-time "Take Back and Transfer" (TNT) monitoring is used. Total call duration will be in this field only if full-time TNT monitoring is used for all outdials. |
| 4 | Not Used |
| 5 | Not Used |
| 6 | Vendor Use Field |
| 7 | Not Used |
| 8 | Vendor Use Field |
| 9 | Not Used |
| 10 | Not Used |
| 11 | Call Completion Code (1 = Completed; 02 = Abandoned; 03 = Completed, used B/RNA; 04 = Abandoned, used B/RNA) |
| 12 | Supplemental Call Completion Code #1 (10 = Abandoned before outdial; 12 = Hangup before answer; 14 = Outdial reached answer) |
| 13 | Supplemental Call Completion Code #2 (0 = outdial had a normal termination (not busy or RNA) no answer); 11 = 1st outdial reached busy; 13 = 1st outdial reached no answer) |
| 14 | ANI - Automatic Number Identification |
| 15 | DNIS - Dialed Number Identification Service |
| 16 | Entry Point |
| 17 | ECS Initial Query - Utterance (30 bytes, value = alpha) |
| 18 | ECS Initial Query - Time in menu (2 bytes, value = numeric) |
| 19 | ECS Initial Query - Number of timeouts (1 byte, value = numeric) |
| 20 | ECS Initial Query - Number of no matches (1 byte, value = numeric) |
| 21 | ECS Initial Query - Number of Help requests (1 byte, value = numeric) |
| 22 | ECS Initial Query - Explicit Agent request (1 byte, value = alpha) |
| 23 | ECS Initial Query - Abandon (1 byte, value = alpha) |
| 24 | ECS Initial Query - Direct Confirmation (1 byte, value = alpha) |
| 25 | CD Initial Query - Utterance (30 bytes, value = alpha) |
| 26 | CD Initial Query - Time in menu (2 bytes, value = numeric) |
| 27 | CD Initial Query - Number of timeouts (1 byte, value = numeric) |
| 28 | CD Initial Query - Number of no matches (1 byte, value = numeric) |
| 29 | CD Initial Query - Number of Help requests (1 byte, value = numeric) |
| 30 | CD Initial Query - Explicit Agent request (1 byte, value = alpha) |
| 31 | CD Initial Query - Abandon (1 byte, value = alpha) |
| 32 | CD Initial Query - Direct Confirmation (1 byte, value = alpha) |
| 33 | ACT - Utterance (30 bytes, value = alpha) |
| 34 | ACT - Time in menu (2 bytes, value = numeric) |
| 35 | ACT - Abandon (1 byte, value = alpha) |
| 36 | CLEP - Utterance (30 bytes, value = alpha) |
| 37 | CLEP - Time in menu (2 bytes, value = numeric) |
| 38 | CLEP - Number of timeouts (1 byte, value = numeric) |
| 39 | CLEP - Number of no matches (1 byte, value = numeric) |
| 40 | CLEP - Number of Help requests (1 byte, value = numeric) |
| 41 | CLEP - Explicit Agent request (1 byte, value = alpha) |
| 42 | CLEP - Abandon (1 byte, value = alpha) |
| 43 | College Credit - Utterance (30 bytes, value = alpha) |
| 44 | College Credit - Time in menu (2 bytes, value = numeric) |
| 45 | College Credit - Number of timeouts (1 byte, value = numeric) |
| 46 | College Credit - Number of no matches (1 byte, value = numeric) |
| 47 | College Credit - Number of Help requests (1 byte, value = numeric) |
| 48 | College Credit - Explicit Agent request (1 byte, value = alpha) |
| 49 | College Credit - Abandon (1 byte, value = alpha) |
| 50 | College Credit - Direct Confirmation (1 byte, value = alpha) |
| 51 | Educator - Utterance (30 bytes, value = alpha) |
| 52 | Educator - Time in menu (2 bytes, value = numeric) |
| 53 | Educator - Number of timeouts (1 byte, value = numeric) |
| 54 | Educator - Number of no matches (1 byte, value = numeric) |
| 55 | Educator - Number of Help requests (1 byte, value = numeric) |
| 56 | Educator - Explicit Agent request (1 byte, value = alpha) |
| 57 | Educator - Abandon (1 byte, value = alpha) |

TABLE 1-continued

Example of CCR and Available Fields

| Field Number | Description/Content |
|---|---|
| 58 | Fee Waivers - Utterance (30 bytes, value = alpha) |
| 59 | Fee Waivers - Time in menu (2 bytes, value = numeric) |
| 60 | Fee Waivers - Number of timeouts (1 byte, value = numeric) |
| 61 | Fee Waivers - Number of no matches (1 byte, value = numeric) |
| 62 | Fee Waivers - Number of Help requests (1 byte, value = numeric) |
| 63 | Fee Waivers - Explicit Agent request (1 byte, value = alpha) |
| 64 | Fee Waivers - Abandon (1 byte, value = alpha) |
| 65 | Fee Waivers - Direct Confirmation (1 byte, value = alpha) |
| 66 | Loan - Utterance (30 bytes, value = alpha) |
| 67 | Loan - Time in menu (2 bytes, value = numeric) |
| 68 | Loan - Number of timeouts (1 byte, value = numeric) |
| 69 | Loan - Number of no matches (1 byte, value = numeric) |
| 70 | Loan - Number of Help requests (1 byte, value = numeric) |
| 71 | Loan - Explicit Agent request (1 byte, value = alpha) |
| 72 | Loan - Abandon (1 byte, value = alpha) |
| 73 | Loan - Direct Confirmation (1 byte, value = alpha) |
| 74 | Register - Utterance (30 bytes, value = alpha) |
| 75 | Register - Time in menu (2 bytes, value = numeric) |
| 76 | Register - Number of timeouts (1 byte, value = numeric) |
| 77 | Register - Number of no matches (1 byte, value = numeric) |
| 78 | Register - Number of Help requests (1 byte, value = numeric) |
| 79 | Register - Explicit Agent request (1 byte, value = alpha) |
| 80 | Register - Abandon (1 byte, value = alpha) |
| 81 | Register - Direct Confirmation (1 byte, value = alpha) |
| 82 | Scores - Utterance (30 bytes, value = alpha) |
| 83 | Scores - Time in menu (2 bytes, value = numeric) |
| 84 | Scores - Number of timeouts (1 byte, value = numeric) |
| 85 | Scores - Number of no matches (1 byte, value = numeric) |
| 86 | Scores - Number of Help requests (1 byte, value = numeric) |
| 87 | Scores - Explicit Agent request (1 byte, value = alpha) |
| 88 | Scores - Abandon (1 byte, value = alpha) |
| 89 | Scores - Direct Confirmation (1 byte, value = alpha) |
| 90 | Search - Utterance (30 bytes, value = alpha) |
| 91 | Search - Time in menu (2 bytes, value = numeric) |
| 92 | Search - Number of timeouts (1 byte, value = numeric) |
| 93 | Search - Number of no matches (1 byte, value = numeric) |
| 94 | Search - Number of Help requests (1 byte, value = numeric) |
| 95 | Search - Explicit Agent request (1 byte, value = alpha) |
| 96 | Search - Abandon (1 byte, value = alpha |
| 97 | Search - Direct Confirmation (1 byte, value = alpha |
| 98 | Indirect Confirmation - Utterance (30 bytes, value = alpha) |
| 99 | Indirect Confirmation - Time in menu (2 bytes, value = numeric) |
| 100 | Indirect Confirmation - Timed out (1 byte, value = alpha) |
| 101 | Indirect Confirmation - Number of no matches (1 byte, value = numeric) |
| 102 | Indirect Confirmation - Number of Help requests (1 byte, value = numeric) |
| 103 | Indirect Confirmation - Explicit Agent request (1 byte, value = alpha) |
| 104 | Indirect Confirmation - Abandon (1 byte, value = alpha |
| 105 | TNT 1 Code |
| 106 | TNT 2 Code |
| 107 | TNT 3 Code |
| 108 | TNT 4 Code |
| 109 | TNT 5 Code |
| 110 | Not Used |
| 111 | Not Used |
| 112 | Not Used |
| 113 | Not Used |
| 114 | Not Used |
| 115 | Not Used |
| 116 | Dialout Sequence Number - The nth dialout placed by ECR during this call. |
| 117 | Outdialed Number - The 800 or DDD number outdialed |
| 118 | Vendor Use Field |
| 119 | Vendor Use Field |
| 120 | Outdial Start Time - The time in relative seconds that this dialout started after the call answer. |
| 121 | Dialout Code - Call attempt status: (31 = Calling party hung up first; 32 = Called party busy; 35 = Called party RNA (timeout); 36 = Equipment failure; 37 = Calling party takeback via DTMF; 38 = Called party hung up after answer, before bridge; −1 = Called party hung up first or used takeback; 99 = Network call processing error) |
| 122 | Not Used |
| 123 | Not Used |
| 124 | Not Used |
| 125 | Outdial Duration 1 - TNT calls only. Cumulative length of time in seconds of the outdial. |
| 126 | Not Used |
| 127 | Not Used |
| 128 | Not Used |
| 129 | Not Used |
| 130 | Not Used |
| 131 | Received From Prior - The call was placed to this outdial number after a previous outdial |
| 132 | Busy/Ring No Answer (BRNA) - Attempt reached busy or no answer (0 = Call not received from prior busy or no answer; 1 = Call received from prior busy or no answer) |
| 133 | Transfer Status - Transfer status indicator (0 = Call neither returned to ECR nor received from a transfer; 1 = Call returned to ECR; 2 = Call received from a transfer; 3 = Call both returned to ECR and received from a transfer) |

Accordingly, a set of field may be defined for various steps in an initiated communication, e.g., initial main menu presentation, sub-menus for test scores, sub-menus for entry of identifying information of the customer, etc. Any format for CCR may be employed that is convenient for organizing data contained in records into fields within each record.

Sample CCRs are provided below according to the CCR format described in Table 1. Accordingly, the CCRs below each include standard call summary information in fields 1-13, dynamic custom data fields beginning in field 14 and preceding the dialout information fields, and standard dialout information fields thereafter. Records using the format shown in Table 1 may therefore vary in length, depending on the number of custom fields that are created for an initiated communication such as a phone call, or the number of "outdials" attempted in a phone call, as the custom fields and out-dial fields may be left blank where an initiated communication does not contain any data for that particular field.

1. Sample A: As indicated by the information contained in the highlighted fields below, the caller in this example dialed the published number for the ECS system and said "password." The ECS system confirmed with the caller that he/she said "password" and the caller replied "yes." Then the caller was connected to an out-dial agent.

071207001822,0057,0000,0000,9999,0000, -

1,0000,0000,1,14,0,02,6468259888,8666309305,741382166,014,MontrOFF,password,16,0,0,0,n ,n,y,,,,,,,,,,,,,,,,,,,,,yes,9,0,0,0,n,n,,,,,,,,,,,,,,,,,,,,,,,,,,,,,,,,,,,,,,,,,,,,,,,,01,8663819067,B,A,0001,-

1,A,00002,01,0035,,0000,00,0000,0,0,02,8663723790,C,B,0037,-1,A,0038,01,0011,

,0000,00,0000,0,2

2. Sample B: In this sample, the customer dialed a published number for the ECS (Enterprise Customer Service) functionality for College Board test scores, timed out in the initial prompt (i.e., did not enter a selection during the allotted period of time), spoke "scores" after the timeout, was prompted again for the same information, and then spoke "SAT" in the subsequent query, as indicated in the highlighted fields.

070928032405,0085,0000,0000,9999,0000, -

1,0000,0000,1,14,0,00,,,,,,,,,1235551111,8001111111,001,scores,15,1,,,,,,,,,,,,,,,,,,,,,,,,,,,,,,, ,,,,,,,,,,,,,,,,,,,,,,,,,,,,,,,,,,,,,,,,,,,,,,,,,,,,,,,,,,,,,,,,,,,,,,,,,,,,,,SAT,,,,,,,,,,,,,01,8667567346,B,A,00

33,-1,A,0034,01,0104, ,0000,00,0000,0,0

3. Sample C: In this sample record, the caller dialed the published number for a Corporate Directory (CD) of the vendor 102, spoke an out of grammar response (i.e., a response that was not recognized by the system), requested help, and then spoke "Test Registration." In the subsequent question, the caller timed out and then spoke "PSAT" after being prompted again, as shown in the highlighted terms below.

070929032405,0104,0000,0000,9999,0000, -

1,0000,0000,1,14,0,00,,,,,,,,,1235551112,8001111112,003,,,,,,,testregistration,25,0,1,1,0,0,,,,,,,,,, ,,,,,,,,,,,,,,,,,,,,,,,,,,,,,,,,,,,,,,,,,,,,,,,,,,,,,,,,,,,,,,,,,,,,,,,,,,,,,,,PSAT,10,1,0,0,0,0,,,,,,,,,,,,,,,,,,,01

,8884777728,B,A,0033,-1,A,0035,01,0145, ,0000,00,0000,0,0

While records have been described herein as taking the form of CCRs using a comma-delimited format, any other formats convenient for data organization and/or storage may be employed. Merely as examples, data may be organized in fields of a word processing document, or any other type of document that contains table or comma-separated data. Accordingly, data associated with steps of an initiated communication may be stored in records that take any form that is convenient.

Response server 104 also provides a platform for a graphical user interface (GUI) that allows a user, e.g., support personnel of vendor 102, to retrieve data from the records. Response server 104 may allow the user to specify Voice Extensible Markup Language (VXML) and/or customer specific elements for which the user wishes to observe operating characteristics of the response server 104 and/or system 100, as will be described further below. A user may specify desired VXML elements to the response server 104, which in turn parses the records, e.g., CCRs and the appropriate fields, and generates a report. The response server 104 may also allow the user to save the generated report as a file in any desired format.

Figure 2A:
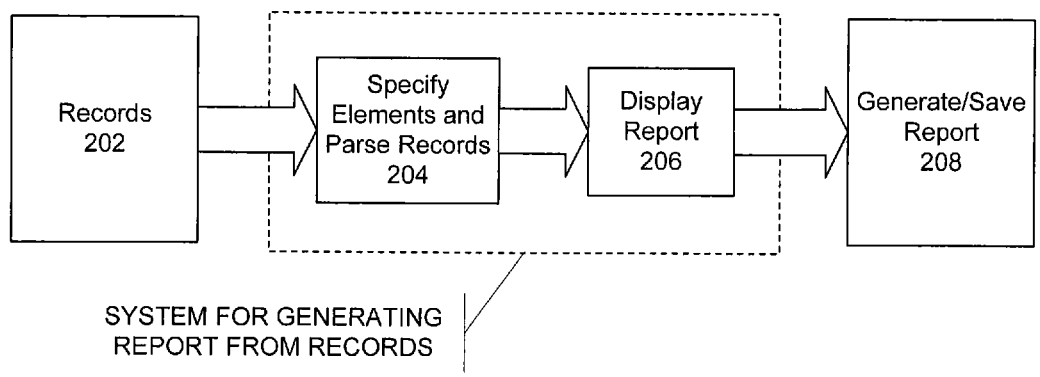
FIG. 2A illustrates an schematic diagram for an exemplary process executed by a response server.

Turning to FIG. 2A, the operation of response server 104 is described in further detail. Response server 104 may access or receive records 202, e.g., from database 122. Response server may parse elements or data from records 202 according to specifications by a user, e.g., support personnel associated with vendor 102, as shown in step 204. Proceeding to step 206, response server 104 displays a report to the user for analysis. Response server 104 may then generate or save the report in step 208.

Figure 2B:
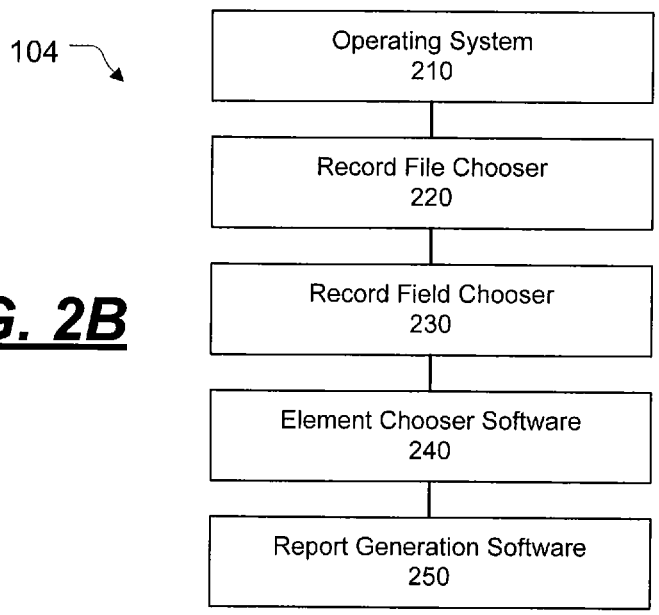
FIG. 2B illustrates a schematic diagram of software elements included in a response server.

Turning now to FIG. 2B, an exemplary system architecture of the response server 104 is shown. Operating system 210 may include any operating system software, such as Microsoft Windows®, Apple MAC OS®, Linux®, Unix®, IBM OS/2®, and/or operating systems for personal digital assistants, cell phones, or other types of computation or communication devices. A record file chooser 220 may include an executable object or process. The operating system 210 may obtain the executable object or process from a server or from a disk, tape, network, CD-ROM, etc. A record field chooser 230 allows the user to define application specific data, e.g., particular steps or results associated with an initiated communication. An element chooser software element 240 may include an executable object or process that allows the user to select elements, e.g., VXML elements, for which the user desires to create a report. For example, the user may identify a particular menu step of an automated phone call, such that information associated with that particular step may be retrieved or aggregated by the response server 104 for presentation to the user. Finally, a report generation software element 250 may be provided on response server 104 that includes an executable object or process for generating a report regarding the desired step indicated by the user. Examples of reports include a list presentation of all results in a particular field, a list of fields indicating a particular result (e.g., all fields that contained a request for "help" by the customer), any statistical manipulations of data contained in certain fields (i.e., average value of all data, median value, etc.), or any other compilation of data contained in the various fields of the records that may be useful in determining an operating quality of system 100.

Figure 3A:
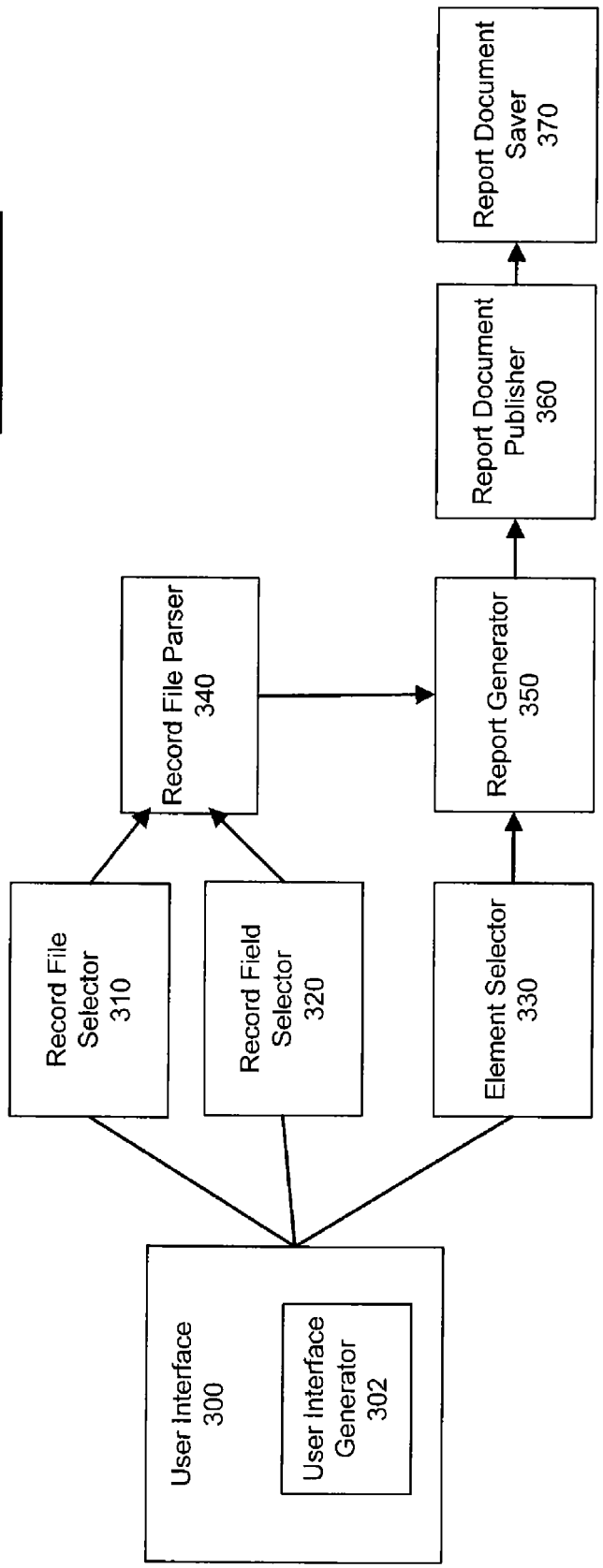
FIG. 3A illustrates a schematic diagram of functional elements included in a response server.

Turning now to FIG. 3A, a diagram of functional components, e.g., software components, of response server 104 is illustrated. Response server 104 may include a user interface 300, a record file selector 310, a record field selector 320, an element selector 330, a record file parser 340, a report generator 350, a report document publisher 360, and a report document saver 370. Any other functional elements may be included for creating, storing, or retrieving records associated with initiated communications, or for generating reports with the records.

User interface 300 of response server 104 may perform a variety of tasks to aid in the generation of report document(s). User interface 300 of response server 104 generally displays an interface, such as via a computer or other telecommunications device of vendor 102, which permits a user, i.e., service personnel of vendor 102, to interact with the response server 104. In one example, user interface 300 may include a user interface generator 302 that generates a user interface. For example, a GUI may be provided on an output device associated with vendor 102. The GUI may be a stand-alone application, a web page, a client/server application, etc., that is accessible to vendor 102. The GUI may be written in a variety of programming languages, including, for example, any of the object oriented programming languages (e.g., java, c++, c#, visual basic, etc.). The user interface 300, using record file selector 310, may provide a display to the user that enables selection of record files to be included in a report. Additionally, the user interface 300 may rely on field selector 320 providing a display of the various fields included in each of the records. A user may accordingly select desired fields associated with a particular step of an initiated communication for which the user desires to create a report. User interface 302 may perform any other additional tasks that may be used to generate report document(s).

Record file selector 310 and record field selector 320 generally provide for the selection of records created by response server 104 and data contained in the records. Record file selector 310 may permit selection of files containing comma delimited records, e.g., CCRs that are created by response server 104 when communications are initiated to vendor 102. Record field selector 320 permits a user to select a desired field located on each record. For example, a user may define "corporate directory" as an available option during an automated phone call. In other words, an option may be presented via an automated menu to a customer that allows them to interact with a directory of vendor 102 by uttering the phrase "corporate directory." Accordingly, the user may subsequently wish to determine the effectiveness of the option as it is presented to customers by retrieving CCR data relevant to the "corporate directory" utterance. The user may enter "corporate directory" into the record field selector 320 using the GUI, and the response server 104 by creating a report based on the specified field, in this case, fields relevant to the "corporate directory" option.

Figure 3B:
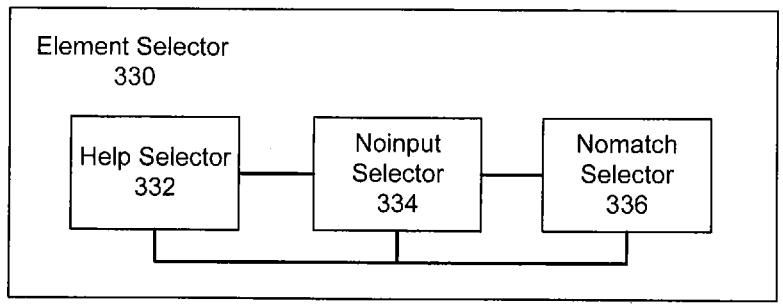
FIG. 3B illustrates a schematic diagram of the element selector shown in FIG. 3A.

Element selector 330 may perform a variety of tasks to aid in the generation of report document(s). For example, as shown in FIGS. 3A and 3B, the element selector 330 includes functional components to specify available elements of the records and facilitate selection of desired elements for a report. The available elements, e.g., a listing of fields in the records, may take the form of VXML elements associated with possible results or outcomes of a particular step involved in any initiated communications. Results indicating a non-favorable, non-positive, or otherwise unsuccessful result, e.g., where an input fails to advance the initiated communication through a particular menu or selection, may be of particular interest in diagnosing performance of system 100 and response server 104. Examples of such non-positive results include a "noinput" result (where no input is received from the customer), a "nomatch" result (where an entry by the customer does not match any selection available to the customer during the particular step or menu), or a "help" result (where the customer exited out of the system by requesting assistance from live service personnel), merely as examples. Element selector 330 can display each field contained in records associated with a particular set of records that have been created by response server 104 and stored in database 122. For example, element selector 330 may be programmed with a listing of fields contained in each of the records to allow a user to select one or more desired fields for inclusion in a report. Where an initiated communication is in the form of phone calls to vendor 102, element selector may include a "help" event selector 332 that permits selection of fields contained in the records that are relevant to a customer request for assistance. Similarly, a "noinput" selector 334 and a "nomatch" selector 336 may be provided, each of which permits selection of fields relevant to a "noinput" event (i.e., no input received from a customer) and a "nomatch" event (i.e., no match for the selection by a customer), respectively. Any other desired field data may be provided by element selector 330, especially field data that is relevant to undesirable outcomes, i.e., outcomes that may result in customer frustration.

Figure 3C:
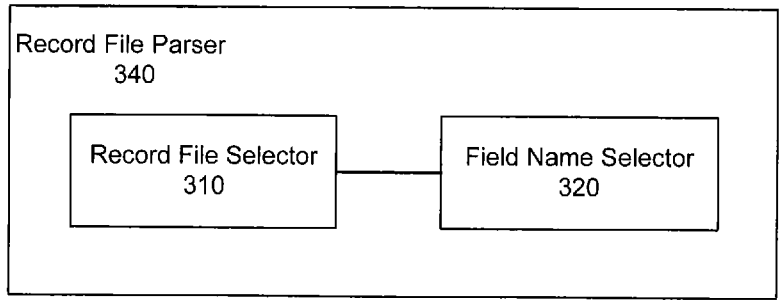
FIG. 3C illustrates a schematic diagram of the record file parser shown in FIG. 3A.

A record file parser 340 of response server 104 generally parses the records selected by record file selector 310 based on the fields selected by the user, thereby extracting data stored in the fields of the records. For example, the record file parser 340 may retrieve data from a same field of one or more records. The fields may be associated with a particular step of an initiated communication, such as options presented in an automated menu (i.e., all data contained in fields related to a step of initiated communications where a customer selected a particular option, such as "display test scores"), or may be fields containing similar data (i.e., all fields where a "help" selection was entered by a customer). The data may then be used to create a report that indicates one or more characteristics of the records and/or steps associated with the selected fields. In other words, data extracted by the record file parser 340 may be analyzed to determine a characteristic of a step during initiated communications, the data having been stored in the records during the initiated communication. As shown in FIG. 3C, record file parser 340 may employ record file selector 310 to retrieve a desired record or set of records from database 122. The user may define record field names indicating the various fields of the records, allowing the user to select only the field(s) for which the user wishes to generate a report. Record file parser 340 may employ record field selector 320 to select the appropriate fields from the desired records after the user indicates the desired fields.

Figure 3D:
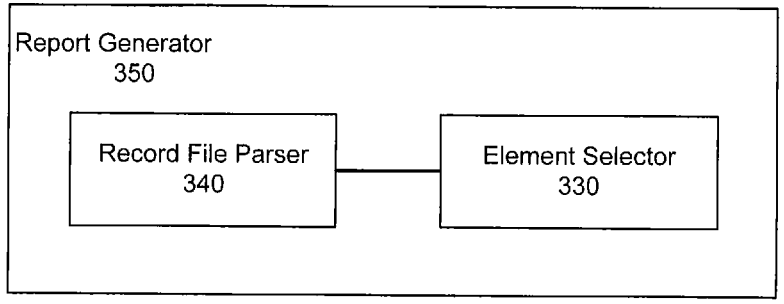
FIG. 3D illustrates a schematic diagram of the report generator shown in FIG. 3A.

Response server further includes report generator 350, which generates a report that includes the data associated with the field(s) selected by the user. Response server may display the data included in each record as retrieved by the record file parser 340 and specified by the element selector 330, and may display the report in any desired format. For example, the report may take the form of a simply listing of the data entries for a particular field(s) included in the records. Alternatively or in addition, the report may also aggregate numerical data for interpretation by the user, e.g., to indicate an average value associated with the data set collected from each particular selected field of the records. The report generator 350 may also include a memory or cache for temporarily storing the report, at least until the report is permanently saved, e.g., to database 122. As shown in FIG. 3D, may generate a record report based on the elements selected by the user, e.g., using element selector 330. Report generator 350 may further rely on record file parser 340 to retrieve data from the desired fields of each of the records. Report generator 350 may temporarily cache the report in a memory (not shown) associated with report generator 350.

Turning back to FIG. 3A, response server 104 also includes a report document publisher 360 that publishes the generated report. The report document publisher 360 may display that report to the user as text and/or as part of a GUI, e.g., user interface 300.

The response server 104 also includes a report document saver 370 that allows the user to save the generated report, such as on response server 104, database 122, or any other available memory or database associated with vendor 102. Report document saver 370, may save the published document in the form of a file. A user can define the name of the file and can save it on a memory device.

Figure 4C:
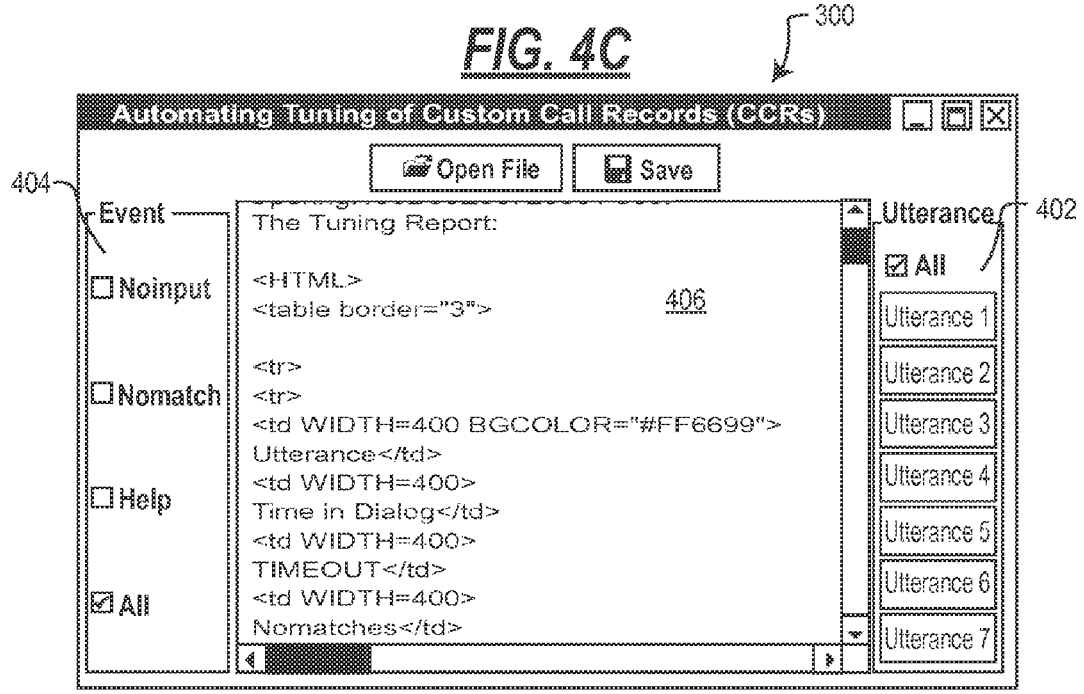
FIG. 4C illustrates the graphical user interface shown in FIG. 4A after a report is generated.

As described above, response server 104 contains software, logic, or other heuristics for creating, storing, and generating reports using a graphical user interface 300. GUI 300 may include any interface that generally allows presentation and selection of records themselves, and/or fields and data contained in records, by a user such as support personnel of vendor 102. For example, GUI 300 may be a software application, e.g., java, which can read a particular format of records associated with initiated communications such as CCRs. One example of a particular GUI 300 is shown in FIGS. 4A, 4B, and 4C. GUI 300 allows for selection of defined utterances listed in a response selection field 402 of GUI 300, e.g., "test scores" or "help." GUI 300 also contains a list of particular events or results that may occur during an initiated communication, e.g., "noinput," "nomatch," "help," etc., in a result selection field 404 of GUI 300. GUI 300 also contains a result display field 406, in which a report generated by response server 104 may be displayed to a user, as best seen in FIG. 4C. GUI 300 may additionally contain any other fields, icons, etc. for facilitating selection and displaying of data contained in records.

Reports generated by response server 104 may take any form that is convenient, such as a simple listing of results for a particular field, a listing of fields for which particular results occur, lists and/or statistical manipulations of data sets compiled from particular fields of records, etc. A report generated by response server 104 may be a web page, or any other output or display format that is convenient. For example, as shown in FIG. 5, a report 500 includes a phase display field 502 for listing a particular step or phase of an initiated communication for which data is desired, a data display field 504 for listing data or displaying statistical manipulations thereof, and a plurality of result display fields 506a, 506b, and 506c for displaying an occurrence of certain events during an initiated communication such as "timeout" (i.e., the initiated communication lasted longer than an allotted period of time and was disconnected), or "nomatches" or "help" as described above. Report 500 may also include an agent display field 508 that indicates a particular agent or support personnel associated with a data set, e.g., a particular support personnel to which a request for assistance was directed.

Figure 6:
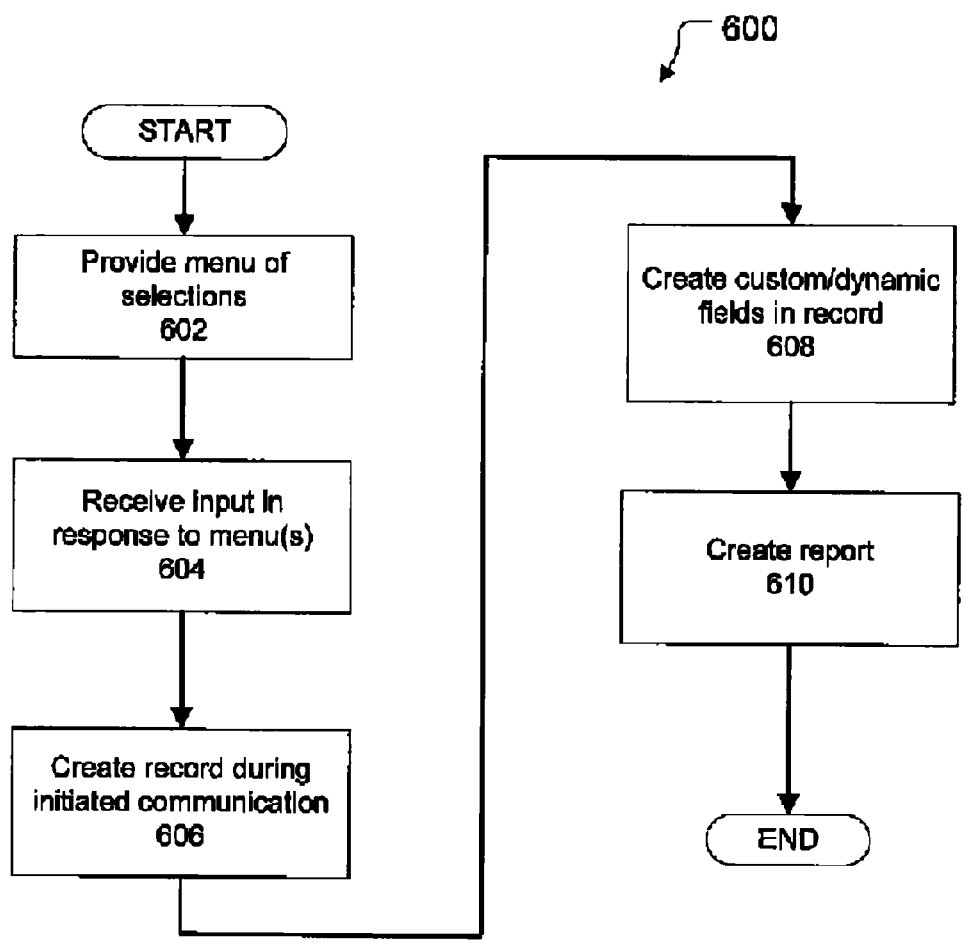
FIG. 6 illustrates an exemplary process for creating, storing, and retrieving records associated with initiated communications.

Turning now to FIG. 6, a process 600 for creating, storing, and retrieving records associated with initiated communications to a vendor is described. Process 600 may begin at step 602, where a menu of available initiated steps is provided during an initiated communication. For example, response server 104 may provide an interactive voice response (IVR) system wherein the response server 104 answers an initiated communication, e.g., a phone call, and provides an automated menu offering selections to a customer initiating the communication. Customers may provide audible utterances, e.g., "test scores," "SAT test," "help," etc., in response to an IVR menu system. Process 600 may then proceed to step 604.

In step 604, an input is received in response to at least one of the menus provided in step 602. For example, a customer may provide an audible utterance to select one of the options provided in the menu. Process 600 may then proceed to step 606.

In step 606, response server 104 creates a record for the initiated communication during the initiated communication. Each record is thus associated with an initiated communication, and includes a plurality of fields that are each associated with one of the menus provided during the initiated communication. The records include data in at least one of the fields that describes one or more characteristics of the input to the menu received in step 604. As non-limiting examples, data may include an indication of which option was selected at a menu, elapsed time between when the menu was provided and when the input was received, or whether a customer was successful in advancing the initiated communication beyond the menu associated with the field in which the data is located, as further described below. The records may take a variety of forms, including a call record such as a CCR that includes identifying information for the record and at least one custom field associated with one of the menus or steps provided during the initiated communication. Response server 104 may store the records created during the initiated communication in any form that is convenient, e.g., a CCR, in database 122. Process 600 may then proceed to step 608.

In step 608, response server 104 may optionally create a number of custom or dynamic fields in the record. The dynamic fields may generally receive data only when the particular menu associated with the dynamic field is present in the initiated communication associated with the record, and may be left blank when the associated menu was not provided during the initiated communication. For example, where a menu is provided as a sub-menu from another menu occurring prior to the sub-menu, and the customer made a selection at the other menu that resulted in the initiated communication never reaching the menu (e.g., a customer help menu was not used during a telephone call because the customer never requested the customer help menu from the main menu), no data will be included in the fields of the record that are associated with the sub-menu. Thus, fields indicating whether a customer provided a particular audible response, e.g., "SAT score," may include data only when the communication initiated by that customer progresses to a menu where the phrase "SAT score" is actually presented as an option. Process 600 may then proceed to step 610.

In step 610, response server 104 creates a report. The report may take any variety of forms, as described above, including the data stored in fields in a raw form, e.g., a listing of each value in a given field of each of the records, a statistical manipulation of the data, e.g., an average time period indicated in a particular field, etc. The report thus may include data from each record. The data may include one or more portions, each generally describing a characteristic of at least one of the inputs for the initiated communication associated with the record. For example, the report may include data from each record for a particular menu selection indicating an elapsed time between when that particular menu was provided, and when an input was received. The portions of data may be taken from a same field of each record, i.e., only from fields that are associated with a certain one of the menus provided in step 602, in order to identify the characteristics of the input for all of the initiated communications where that particular menu selection occurred. For example, the data portions could be extracted only from records containing data in a field associated with a help menu to analyze a data set associated with the wait time for customers in the help menu. Response server 104 would thus extract data only from records that contained data in the fields associated with the help menu.

Data may also be extracted from the records and included in the report based upon a value of the characteristic. For example, response server 104 could extract data from any fields included in the records that indicate an elapsed time between providing a menu, i.e., step 602, and receiving an input, i.e., step 604, that is longer than a predetermined time. A report may thus include a listing of fields that indicate excessive wait times for the menu associated with the fields.

Data taken from the records and included in the report may also indicate a non-positive or otherwise unsuccessful result of menus associated with the fields from which the data is extracted. For example, a "nomatch" indication in a certain field may indicate that the input failed to advance the initiated communication beyond the menu because the input did not match any of the selections included in the menu. Other examples of data that may indicate that a customer experienced difficulty advancing an initiated communication beyond a menu include requests for help as opposed to a selection of one of the options presented in the menu.

Data extracted from the records to create the report may describe multiple characteristics. For example, a first portion of the data may describe the results of a first menu of a collection of initiated communications, e.g., what selection the customer chose after being presented with the menu. A second portion of data may be extracted that indicates a second characteristic of the same inputs, e.g., a wait time associated with the menu after the input selection identified by the first portion of the data was received.

Response server 104 may thus retrieve data stored in the records in creating the reports. Data may be retrieved according to a request submitted by a user associated with vendor 102, e.g., via GUI 300 to analyze performance of response server 104 and/or system 100. Retrieved data may include a listing of fields contained in each of the records that contain a predetermined result, e.g., a listing of fields where the result of a particular step was a request for help by a customer. Retrieved data may alternatively or in addition include a listing of data contained in a predetermined field of each of said records, e.g., a time period associated with a wait time after entry of a particular menu or step of an initiated communication. Data may be retrieved from the record by requesting a particular fields present in each of the records, e.g., all data contained in fields indicating which numbered response was entered by a customer in a particular step. The retrieved data may also include fields of the records that contain a predetermined result specified by a user associated with vendor 102. For example, a user may specify results associated with any initiated communications that indicate a non-positive result of a menu or a failure to advance an initiated communication beyond a particular menu. Examples may include a disconnection of a phone call, an indication that a selection entered by a customer does not match an available selection, an indication that no selection was received from the customer, a selection by a customer to request help during the initiated communication, etc. The retrieved data may also include qualitative data, e.g., numerical data indicating a number of times a particular selection is made by customers, a wait times associated with a particular step after entry by a customer.

Retrieved data may take any variety of forms, such as an indication of a selection submitted during a step of the initiated communication. The selections may include an audible utterance, i.e., where a customer responds "SAT scores," "directory assistance," "help," etc. Selections may also include a data entry created by any of devices 106, 108, 110, 112, such as numerical or text entries indicating a selection of a particular menu option. Process 600 may then terminate.

System 100 and process 600 may thus allow for the diagnosis of any potentially non-positive or incomplete results experienced by customers while engaged with vendor 102 via an automated response system. For example, response server 104 may create data indicating various results and selections made by customers while participating in an initiated communication, e.g., phone calls or website submissions, and may organize the created data in records indicating what selections were made by the customer, a time period a customer waited after making a selection, a time period a customer waited before making a selection, etc. Data may subsequently be parsed or collected from the records by response server 104 and displayed in the form of reports indicating aggregate performance of system 100, response server 104, and process 600 according to a comparison of the data with expected results.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A communication system comprising:
a response server storing an automated response heuristic for a vendor; and
a database in communication with said response server;
wherein said response server is configured to:
provide, without the assistance of live support personnel, to users who initiate communications with the vendor, a series of menus according to the automated response heuristic during a plurality of initiated communications to the vendor, each of said menus including a group of selections,
receive an input from one of the users in response to at least one of said menus for each of the plurality of initiated communications,
automatically create, without the assistance of live support personnel, a record for each of the plurality of initiated communications, each said record including:
a plurality of fields, each of said plurality of fields associated with one of said menus; and
data in at least one of said plurality of fields, said data describing at least one characteristic of the input received in response to the menu with which said at least one of said plurality of fields is associated, said at least one characteristic of the input including at least one of: whether a user requested assistance, whether the user made a selection, whether the user selection matched the selections of a respective menu, and a duration of a time lapse before the user made a selection; and
create a report about the automated response heuristic including diagnostic information about a given type of input received from the users in response to at least one of the menus, a characteristic of the given type of input including: a request for assistance was received in response to the respective menu, no selection was received in response to the respective menu, there was no match for a selection received in response to the respective menu, and a duration of a time lapse before a selection was received in response to the respective menu exceeded an allotted period of time.

2. The communication system of claim 1, further comprising a graphical user interface configured to submit a request to said response server to create said report, said request including an identification of records to be included in said report.

3. The communication system of claim 1, further comprising a graphical user interface configured to submit a request to said response server to create said report, said request identifying a value associated with said given type of input, wherein said information is generated based on an aggregation of data in the records for the plurality of initiated communications using said value as a selection criteria.

4. The communication system of claim 3, wherein a characteristic of the given type of input is the duration of a time lapse before a selection was received exceeded the allotted period of time, and said value is said allotted period of time.

5. The communication system of claim 1, further comprising a graphical user interface configured to submit a request to said response server to create said report, said request identifying one of the fields included in said records, wherein said information is based on data from those records having said data in the identified one of the fields.

6. The communication system of claim 1, further comprising a graphical user interface configured to submit a request to said response server to create said report, said request including a value associated with said given type of input, wherein said information is generated based on an aggregation of instances of data in the records for the plurality of initiated communications using said value as a selection criteria, said value setting a threshold for whether the instances of data indicate that the input whose characteristic the respective instance of data describes failed to advance the initiated communication through said at least one of said menus.

7. The communication system of claim 1, wherein said response server is configured to create said data for each record during the initiated communication associated with said each record.

8. The communication system of claim 1, wherein said response server is configured to receive audible utterances as said input.

9. The communication system of claim 8, further comprising a graphical user interface configured to submit a request to said response server to create said report, said request identifying a value associated with said given type of input, wherein the information is generated based on an aggregation of instances of data in the records for the plurality of initiated communications using said value as a selection criteria, said value setting a threshold for whether the instances of data indicate that the audible utterance whose characteristic the respective instance of data describes failed to advance the initiated communication through said at least one of said menus.

10. A system comprising:
a response server in communication with a data network and configured to access an automated response heuristic for a vendor, said data network including a data line for said vendor configured to transmit initiated communications to said vendor; and
a database in communication with said response server;
wherein said response server is configured to:
provide, without the assistance of live support personnel, to users who initiate communications with the vendor, a series of menus according to the automated response heuristic during a plurality of initiated communications to the vendor, each of said menus including a group of selections,
receive an input from one of the users in response to at least one of said menus for each initiated communication,
automatically create, without the assistance of live support personnel, a record for each of the plurality of initiated communications, each said record including:
a plurality of fields, each of said plurality of fields associated with one of said menus; and
data in at least one of said plurality of fields, said data describing at least one characteristic of the input received in response to the menu with which said at least one of said plurality of fields is associated, said at least one characteristic of the input including at least one of: whether a user requested assistance, whether the user made a selection, whether the user selection matched the selections of a respective menu, and a duration of a time lapse before the user made a selection; and
create a report about the automated response heuristic including diagnostic information about a given type of input received from the users in response to at least one of the menus, a characteristic of the given type of input including: a request for assistance was received in response to the respective menu, no selection was received in response to the respective menu, there was no match for a selection received in response to the respective menu, and a duration of a time lapse before a selection was received in response to the respective menu exceeded an allotted period of time.

11. A response server that receives user-initiated communications and applies an automated response heuristic thereto, comprising:

a processor; and a memory having program code stored thereon that, when executed by the processor, causes the response server to:

during the user-initiated communications, apply the automated response heuristic including automatically providing to the users a series of menus each including a group of available selections and receiving inputs from the users in response to the menus, for each of the user-initiated communications, automatically create, without the assistance of live support personnel, a record that includes at least one entry associated with each of the menus that was provided to the user during a respective communication, the at least one entry indicating at least one of: whether the user requested assistance in response to a respective menu, whether the user made a selection in response to the respective menu, whether a selection of the user in response to the respective menu matched the group of available selections of the respective menu, and a duration of a time lapse before the user made a selection in response to the respective menu; and create a report about the automated response heuristic including diagnostic information about at least a given one of the menus, the diagnostic information being based on an aggregation of entries associated with the given menu in a plurality of the records and quantifying a given type of entry that indicates at least one of: a request for assistance was received in response to the given menu, no selection was received in response to the given menu, there was no match for a selection received in response to the given menu, and a duration of a time lapse before a selection was received in response to the given menu exceeded an allotted period of time.

12. The response server of claim 11, wherein:
the record of each user-initiated communication includes a first entry associated with at least the given menu, the first entry indicating a duration of a time lapse before the user made a selection in response to the given menu, and
the diagnostic information is based on an aggregation of the first entries of the plurality of records, the diagnostic information quantifying the given type of entry by indicating a typical value of the first entry in the plurality of records.

13. The response server of claim 11, wherein:
the record of each user-initiated communication includes a first entry associated with at least the given menu, the first entry indicating a duration of a time lapse before the user made a selection in response to the given menu, and
the diagnostic information is based on an aggregation of the first entries of the plurality of records, the diagnostic information quantifying the given type of entry by indicating how many of the plurality of records have a first entry whose value exceeds a threshold value.

14. The response server of claim 13, wherein the program code, when executed by the processor, further causes the response server to:
receive a request from a technician to generate the report, the request including a first value designated by the technician; and
set a value of the threshold value to the first value prior to generating the report.

15. The response server of claim 11, wherein:
the record of each user-initiated communication includes a second entry associated with at least the given menu, the second entry indicating whether the user requested assistance in response to the given menu, and
the diagnostic information is based on an aggregation of the second entries of the plurality of records, the diagnostic information quantifying the given type of entry by indicating how many of the second entries of the plurality of records indicate that the user did request assistance in response to the given menu.

16. The response server of claim 11, wherein:
the record of each user-initiated communication includes a third entry associated with at least the given menu, the third entry indicating whether no selection was received in response to the given menu, and
the diagnostic information is based on an aggregation of the third entries of the plurality of records, the diagnostic information quantifying the given type of entry by indicating how many of the third entries of the plurality of records indicate that no selection was received in response to the given menu.

17. The response server of claim 11, wherein:
the record of each user-initiated communication includes a fourth entry associated with at least the given menu, the fourth entry indicating whether there was no match for a selection received in response to the given menu, and
the diagnostic information is based on an aggregation of the fourth entries of the plurality of records, the diagnostic information quantifying the given type of entry by indicating how many of fourth entries of the plurality of records indicate that there was no match for a selection received in response to the given menu.

18. The response server of claim 11, wherein the program code, when executed by the processor, further causes the response server to:
provide a graphical interface to a technician, the graphical interface providing report generation options that are selectable by the technician, the report generation options including a menu option that allows the technician to select one of the menus;
receiving, via the graphical interface, a request from the technician to generate the report, the request including a menu option selection;
wherein the report is generated in response to the request and the given menu is determined based on the menu option selection.

19. The response server of claim 18,
wherein the report generation options further include response characteristic options that allow the technician to select at least one response characteristic, the response characteristics including: whether the user requested assistance in response to the respective menu, whether the user made a selection in response to the respective menu, whether a selection of the user in response to the respective menu matched the group of available selections of the respective menu, and a duration of a time lapse before the user made a selection in response to the respective menu,
wherein the request includes a response characteristic option selection and the given type of entry that is quantified by the diagnostic information is determined by the response characteristic option selection.

20. The response server of claim 11, wherein the series of menus are provided to the users as audible utterances, and the response server is configured to receive audible utterances as the inputs received from the users in response to the menus.

* * * * *